S. E. MOINE.
SHIFTING CAMERA BACK.
APPLICATION FILED FEB. 25, 1913.
1,110,333.
Patented Sept. 15, 1914.
3 SHEETS—SHEET 1.
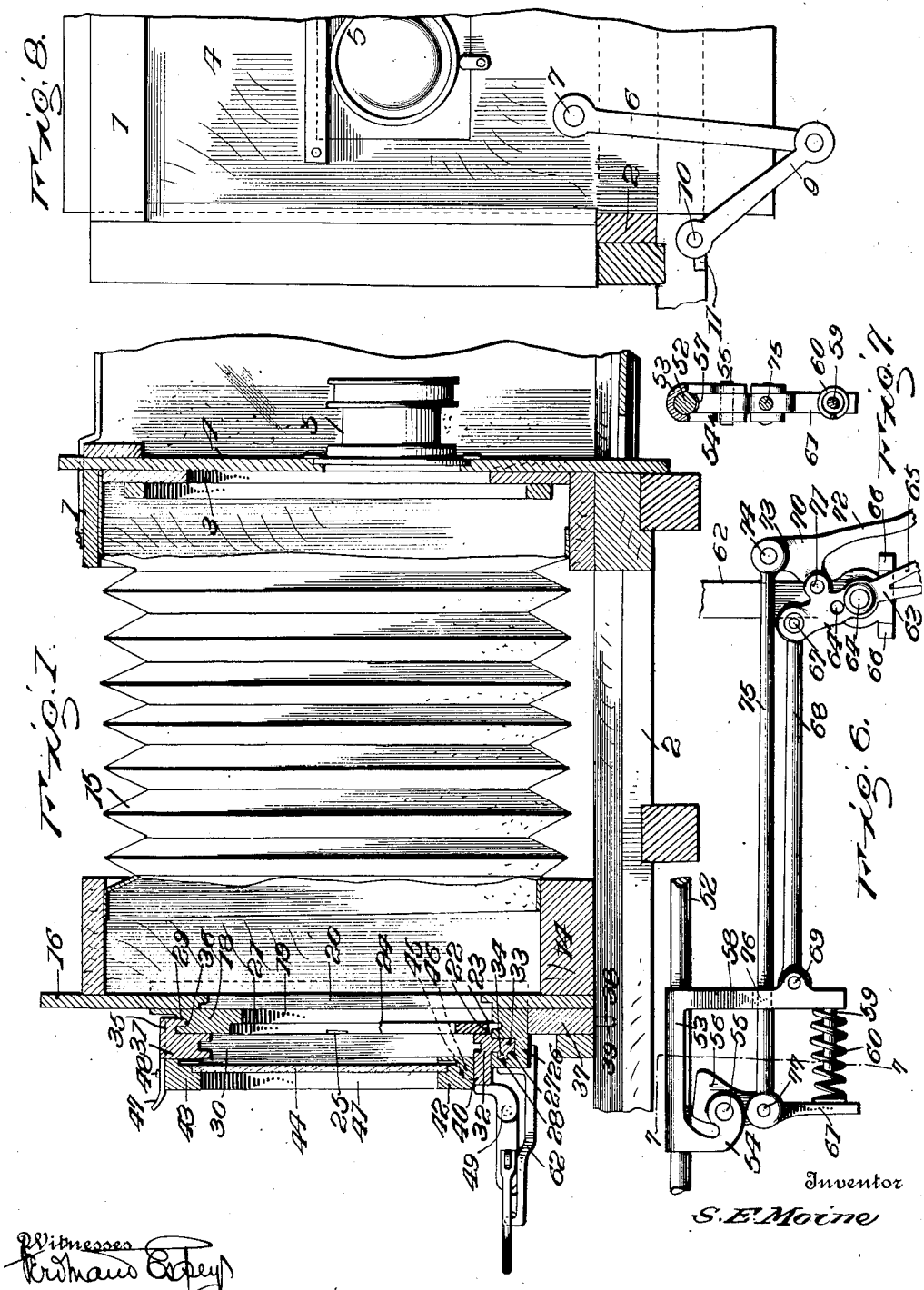

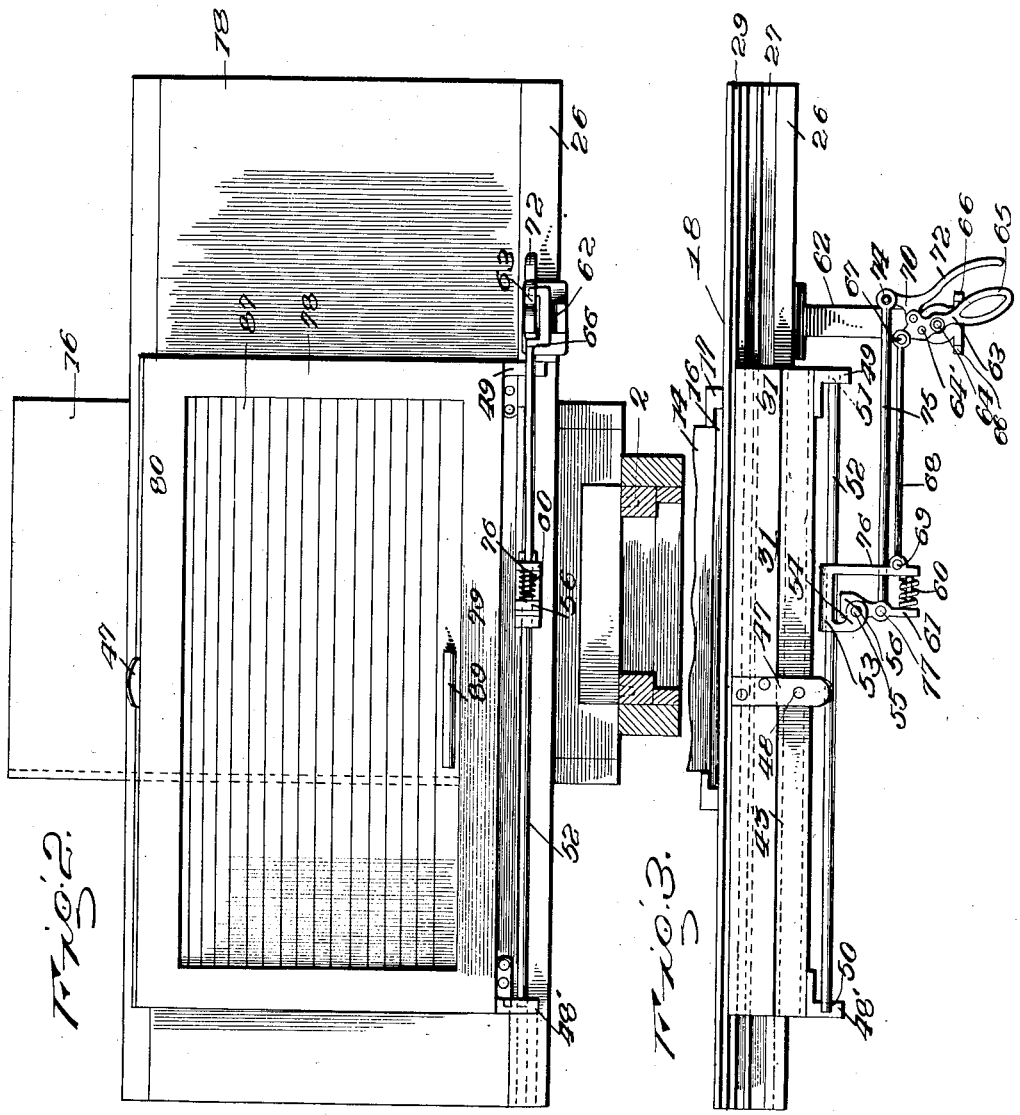

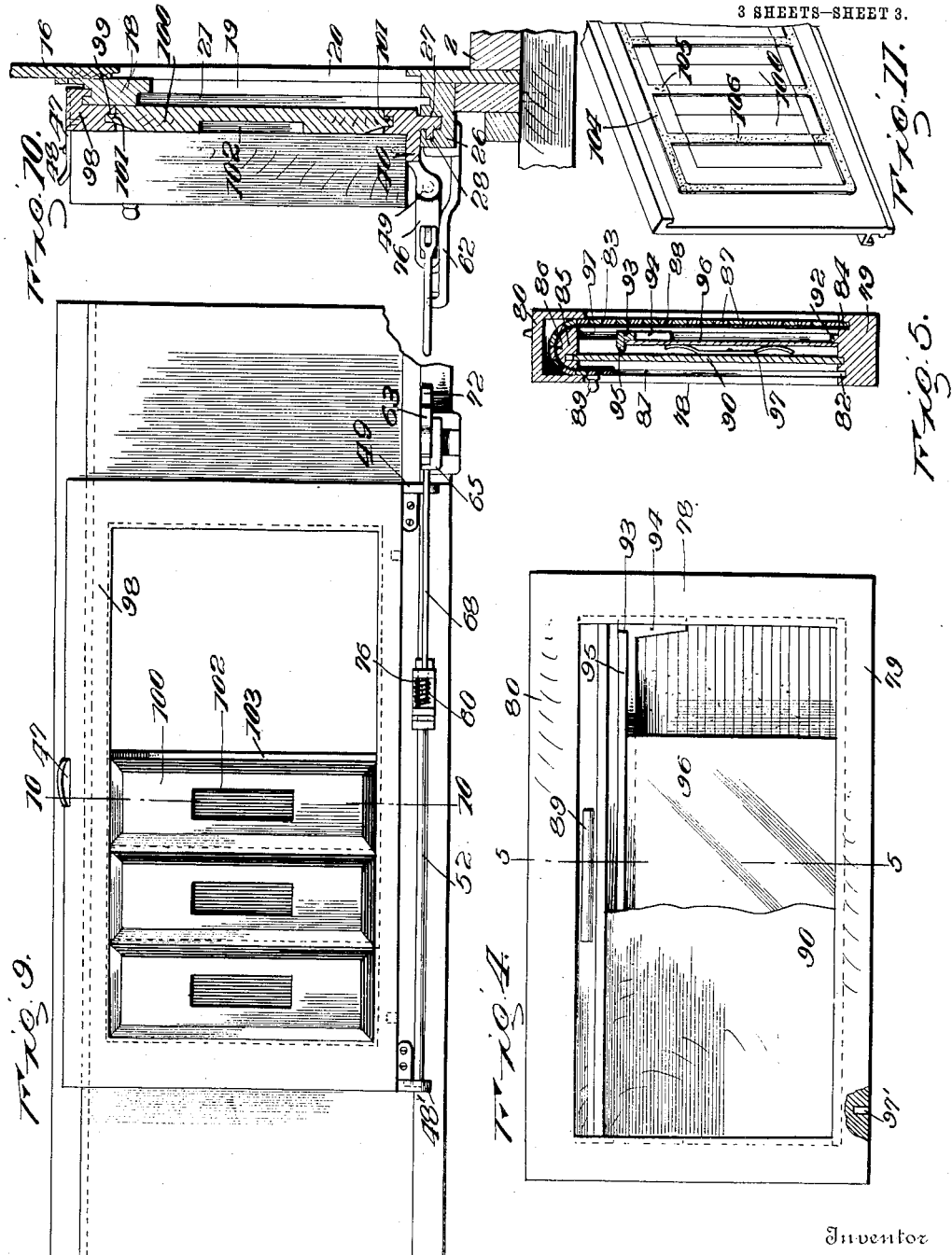

UNITED STATES PATENT OFFICE.

SELEST E. MOINE, OF TULIA, TEXAS.

SHIFTING CAMERA-BACK.

1,110,333.

Specification of Letters Patent. Patented Sept. 15, 1914.

Application filed February 25, 1913. Serial No. 750,692.

*To all whom it may concern:*

Be it known that I, SELEST E. MOINE, citizen of the United States residing at Tulia, in the county of Swisher and State of Texas, have invented certain new and useful Improvements in Shifting Camera-Backs, of which the following is a specification.

This invention relates to photographic apparatus and more particularly to a camera or camera attachment designed particularly for use in taking large groups, or in taking a number of exposures on a large sensitized plate or film. The ordinary portrait camera is limited in its usefulness so far as the size of the negative which can be produced thereby, is concerned, and, when of the ordinary construction, cannot be successfully employed in taking a number of exposures on a single plate or film. The present invention, therefore, contemplates the provision of a camera back which may either form a part of a specially constructed camera or be employed as an attachment to an ordinary portrait camera, and which will be adapted to support a sensitized plate or film much larger than the ordinary plate or film used in the ordinary portrait camera, in such manner that certain definite portions of the plate or film may be exposed in succession either for the purpose of producing a large group view or a number of separate and distinct views upon the same plate or film.

Another aim of the invention is to so construct the camera back that plates of various sizes may be arranged and supported therein and adjusted with relation to the opening in the back proper.

A further aim of the invention is to provide means which may be readily and quickly manipulated to secure accurate adjustment of the back with relation to the body of the camera so as to properly position the plate with respect to the opening in the back proper.

For a full understanding of the invention reference is to be had to the following description and accompanying drawing, in which:—

Figure 1 is a front to rear section through a camera, the back of which is constructed in accordance with the present invention, the focusing-frame being in position. Fig. 2 is a rear elevation of the back. Fig. 3 is a top plan view of the camera back. Fig. 4 is a rear elevation of the plate holder, the shutter being in position to close the front of the holder, parts being broken away. Fig. 5 is a vertical transverse sectional view through the holder on the line 5—5 of Fig. 4. Fig. 6 is a top plan view in detail of the adjusting mechanism for the back. Fig. 7 is a vertical sectional view on the line 7—7 of Fig. 6. Fig. 8 is a view looking at the front of the camera, parts being broken away, and parts being shown in section. Fig. 9 is a view in rear elevation illustrating a slight modification. Fig. 10 is a vertical sectional view on the line 10—10 of Fig. 9. Fig. 11 is a detail perspective view illustrating the cut-off slides shown in Figs. 9 and 10.

Corresponding and like parts are referred to in the following description and indicated in all the views of the drawings by the same reference characters.

In the drawings, the camera front is indicated in general by the numeral 1 and the camera bed by the numeral 2. The front 1 is open as indicated at 3, and a lens-board 4 is supported for vertical adjustment upon the forward face of the front 1 and carries a lens holder 5, it being understood that the lens-board closes the opening 3 in the camera front in a light tight manner at all points of its adjustment. The lens-board 4 is adjusted by means of an arm 6 pivoted thereto as at 7 and connected as at 8 to a crank-arm 9 fixed upon a rock-shaft 10. The shaft 10 is supported in a bearing 11 arranged at one side of the camera bed 2. The arrangement of this shaft 10 and the means for rocking the same is clearly shown and described in my co-pending application, Serial No. 699,276, filed May 23, 1912.

The camera back is indicated in general by the reference numeral 14 and connecting the front 1 and back 14 is the usual bellows-body 15. The body 14 is closed at the rear by a back-plate 16 the side edges of which project beyond the sides of the body 14 and are slidably engaged by cleats 17 upon the rear face of a supporting plate 18 having an opening 19 therein equidistantly spaced from the ends of the plate. The opening 19 is located opposite an opening 20 which is formed in the plate 16 and it will be observed from inspection of Fig. 1 of the drawings, that the sight opening 19 defines the exposure area of the back. The walls of the opening 19 are rabbeted as at 21 and the lower wall is provided with a groove 22 in which is fitted a rib 23 at the lower side of a reducing frame 24 supported within the rabbet, the sides of the frame being engaged by latches 25 located at the sides of the opening. A number of these frames 24 may be provided and may have openings of various sizes so as to vary the exposure area when so desired. The plate 18 is provided at its lower side and upon its rear face with a ledge 26 formed with a groove or channel 27 and in one wall of the groove with a second groove 28. This ledge extends the entire width of the plate 18 and the grooves 27 and 28 are open at both ends. The plate 18 at its upper side is provided with a groove 29 which extends the entire width of the plate. The plate 18 is designed to support a supporting frame for the plate holder of the back, which frame includes sides 30, a top 31 and a bottom 32. The bottom 32 of the frame is formed with a depending rib 33 provided upon one face with a rib 34 slidably fitting in the groove 28, the rib 33 being slidably received in the groove 27. The top 31 of the frame is extended forwardly as at 35 to project above the upper edge of the plate 18 and is provided with a depending rib 36 slidably fitting in the groove 29. At this point it will be apparent that the supporting frame is supported for sliding movement across the rear face of the plate 18 from end to end thereof and that when desired it may be completely dismounted and a frame of different structure substituted therefor. It will be seen by reference to Fig. 1 of the drawing that the supporting frame 30 has its opening of approximately the same size as the opening 20. However, it may be stated at this point that the opening 20 is of greater height than the opening 19, and the purpose of so relatively proportioning the openings will be presently explained. It will also be noted that the plate 18 rests at its lower edge upon a block 37 having pins 38 fitting in sockets 39 in the frame members of the camera, the downward movement of the plate upon the back-plate 16 being in this manner limited so as to prevent exposure of the upper portion of the opening 20.

The frame 30 has a rearwardly extending supporting ledge 40 and the frame as a whole is designed to support a ground-glass holder or finder-frame, as shown in Fig. 1, or the plate holder shown in Figs. 2, 4 and 5 of the drawings. The focusing-frame consists of side-members 41, a bottom 42 and a top 43, and arranged within this frame and permanently supported is a ground-glass 44. The bottom 42 of the frame is formed with sockets 45 and the ledge 40 is provided with upstanding pins 46 which engage in the sockets 45 when the focusing-frame is disposed upon the ledge. In order to hold the frame in place a spring-latch finger 47 is secured upon the top 31 of the supporting frame and projects inwardly therefrom and engages with a stud 48 upon the top 43 of the focusing-frame. By referring to Fig. 2 of the drawing, it will be observed that the focusing-frame is of a width considerably greater than the body 14 of the camera back, and it will be understood that the supporting frame 31 being slidable upon the plate 18, supports the focusing-frame for adjustment transversely of the opening in the back-plate 16 so that different portions of the ground-glass 44 may be successively brought into position opposite the opening in the said plate 16.

It will of course be understood that the supporting frame 30 may be adjusted upon the plate 18, manually, but means is provided whereby the frame may be accurately adjusted after it has been positioned at approximately the proper adjustment, and this means will now be described. Brackets 48' and 49 are secured to the rear side of the ledge 40 of the supporting frame and the bracket 48' is provided with an open socket 50 whereas the bracket 49 has a closed socket 51. A rod 52 is seated at its ends in the said sockets and may be readily dismounted when desired by lifting it out of the socket 50 and withdrawing its other end from the socket 51. It will be apparent from an inspection of Fig. 3 of the drawings that the rod 52 extends parallel to the rear side of the ledge 40 and the means provided for adjusting the supporting frame is in the nature of a clutch device coöperating with the said rod. The clutch device includes a semi-cylindrical body portion or sleeve-member 53 which embraces the forward side of the rod 52, in a manner clearly shown in Figs. 6 and 7 of the drawings, and this sleeve member is provided at one end with rearwardly projecting bracket arms 54 between which is pivotally mounted as at 55, a dog 56, the head of which is recessed as at 57 to partly embrace the rear side of the rod 52 when the dog is swung upon its pivot in one direction. At its opposite end, the sleeve-member 53 is provided with a rearwardly extending bracket 58 carrying a laterally projecting pin 59 which supports a spring 60 bearing at one end against the bracket and at its other end against an arm 61 which extends rearwardly from the dog. The spring 60 normally holds the dog 56 in such position that its gripping end 57 will be out of engagement with the rod 52. A bracket 62 is secured to the ledge 26 of the plate 18 and projects rearwardly from the said ledge and supports a lever which may be manipulated for the purpose of moving the clutch device just described so as to adjust the supporting frame 30. The lever mentioned above is indicated by the numeral 63 and is pivoted as at 64 upon the upper side of the bracket 62 and has a handle 65 projecting between the stop lugs 66 which project from the upper side of the bracket. Pivoted to the forward end of the lever 63 as at 67, is one end of a rod 68, the other end of which is pivoted as at 69 to the bracket 58.

It will be apparent from the foregoing and from inspection of Fig. 6 of the drawing that when the handle end of the lever 65 is swung to the left of the said figure a pull will be exerted in the opposite direction on the rod 68 thereby moving the clutch device to the right, in the said figure. In order that such movement of the clutch device may result in a corresponding movement of the rod 52 and consequently of the supporting frame 30 and the ground-glass focusing frame or plate holder supported thereby, a small hand-lever 70 is pivoted, as at 71 to the forwardly extending portion of the lever 63, and has a grip portion 72 projecting beside the handle portion 65 of the said lever and a portion 73 which projects forwardly beyond the pivot 71 and has connected to it at 74 one end of a rod 75. The rod 75 extends through an opening 76 formed in the bracket 58 and is pivoted as at 77 to the dog 56 rearwardly of the pivot 55. It will now be seen that upon gripping both of the lever handles 65 and 72, a pull will be exerted toward the right in Fig. 6, upon the rod 75, thereby swinging the dog 56 upon its pivot in such manner as to bring its end 57 into gripping engagement with the rod 52. The dog of the sleeve member being in this manner brought into gripping engagement with the rod 52, the lever 65 is swung to the left of said Fig. 6, thereby moving the rod 52, through the medium of the clutch device, to the right of the said figure, this movement being limited by the engagement of the lever against the left-hand one of the stops 66. It will be understood, of course, that the members 63 and 70 may be manipulated to adjust the supporting frame to the left, as well as to the right, and that normally the clutch device is free from engagement with the rod 52, thereby permitting free manual adjusting of the supporting frame.

The plate holder, heretofore mentioned, includes sides 78, a bottom 79 and a top 80. The sides 78 of the plate holder are formed with grooves 81 and the bottom 79 is formed with a groove 82 connecting the lower ends of the groove 81. The sides are also formed with grooves 83 connected by a groove 84 in the said bottom 79. The top 80 or plate-holder frame is hollow, as clearly shown in Fig. 5 of the drawings and extending within the top is a guide strip 85, the upper side of which is rounded as indicated at 86. The forward and rear edges of the strip 85 register with the upper ends of the grooves 81 and 83 and it is over this strip and in the grooves 81 and 83 that the flexible shutter of the holder is guided. This shutter consists of a number of relatively narrow and thin strips 87 which are secured transversely upon the face of a backing-sheet 88 of black cloth of the kind usually employed in similar relations in photographic apparatus.

It will be apparent from an inspection of Fig. 5 of the drawings that the shutter 87 is of such length that when in the position shown in this figure it will at one end seat in the groove 84, its lateral edges seating, of course, in the grooves 83 and at its other end the shutter passes over the strip 85 and seats at its lateral edges in the grooves 81. At its last mentioned end the shutter is provided with a knob or finger-piece 89 by means of which it may be shifted in the grooves and over the said strip 85. The manner of manipulating the shutter will be presently fully explained.

A plate 90 is removably arranged within the frame of the plate holder and completely closes the holder at the back, the frame extending between the sides of the holder and between the bottom 79 and the guide strip 85. This plate serves to exclude light from the holder at the back thereof and when the shutter 88 is in the position shown in Fig. 5, it serves to exclude light from the holder at the front. Grooves 91 are formed in the sides 78 of the plate-holder frame and a bead 92 is formed upon the upper side of the bottom 79 and extends between the lower ends of the said groove 91. A kit is arranged for sliding movement in the groove 91 and consists of a strip 93 provided at its ends with downwardly projecting wings 94 engaging slidably in the said grooves 91 and a rearwardly projecting flange or rib 95 which is designed to engage with the upper edge of a sensitized plate 96 arranged within the holder and disposed at its lower end against the bead 92. Springs 97 are secured upon the forward face of the plate 90 and bear against the sensitized plate 96 and serve to hold the plate firmly in position. It will be understood, of course, that the kit 93 serves to adapt the holder for the reception of plates of various sizes. The bottom 79 of the plate-holder is provided with sockets 97' which receive the upstanding pins 46 upon the ledge 40 of the supporting frame 30 when the plate holder is disposed upon the said ledge after the removal of the focusing frame. By referring to Fig. 5 of the drawing it will be apparent that when the shutter of the plate holder is in the position shown in Fig. 5, light will be excluded from the plate 96 and the holder may be safely carried from the dark room to the camera and placed in position upon the supporting frame. When it is desired to make the exposure, the handle 89 is gripped and the shutter is pulled downwardly so as to uncover the plate 96. After the exposure has been made, the shutter is returned to its original position and the supporting frame is then adjusted for another exposure or the plate-holder may be removed from the supporting frame, if the plate has been fully exposed, and carried to the dark room. It will be understood, of course, that the supporting frame 30 is provided upon its forward face with suitable cloth backing strips so that light will be excluded at all sides of the frame at all points in the adjustment thereof.

In the form of the invention, just described, the supporting frame and the plate 18 are of such width that all portions of a sensitized plate arranged within the plate-holder supported by the frame, may be exposed, without, however, either end of the plate-holder or the supporting frame projecting beyond the ends of the plate 18. However, where an exceptionally long plate holder is employed, and it is not desired to increase the width of the plate 18, a light excluding device, such as shown in Figs. 9, 10 and 11 of the drawings may be employed. In the said figures the supporting frame is indicated by the numeral 98 and is of the same construction as the frame 30. The upper and lower members of the frame 98 are formed with grooves 99 and arranged within the frame are a number of light excluding slides 100. Each of these slides is provided at its upper and lower ends with tongues 101 which slidably fit within the grooves 99, and it will be observed that the combined width of the slides is less than the width of the sight opening in the supporting frame and that the slides may be adjusted in the frame so as to lie at one end or the other of the said opening or may be otherwise arranged so as to vary the location of so much of the opening as is not covered by the slides. Each of the slides 100 is provided in its rear face with a recess 102 in which the fingers may be engaged when adjusting the slides and in order that light may be completely excluded between the edges of the slides, they are provided with interfitting tongues and grooves, indicated in general by the numeral 103. As before stated, the supporting frame is provided upon its forward face with cloth backing strips to exclude light and in Fig. 11 of the drawings these strips are indicated by the numeral 104 and extend along the sides and top and bottom of the frame.

The strips which extend at the top and bottom of the frame have strips 105 extending at intervals therefrom toward the sight opening of the frame and the light excluding slides 100 are provided upon their forward faces each with a vertically extending strip 106 designed to register at its upper and lower ends with corresponding ones of the strips 105. In the use of this form of the invention, when the supporting frame and plate holder are in position to permit of the exposure of one end of the plate, the supporting frame and plate holder may be projected a greater or less distance beyond one end of the plate 18 but due to the peculiar arrangement of the backing strips shown in Fig. 11, light will be excluded from the plate-holder in the projecting end thereof, and when the other end of the plate is to be exposed the light excluding slides may be fixed to the opposite end of the supporting frame. In order that the throw of the lever 63 may be varied when desired, it is formed with an opening 64' to receive the pivot 64.

In using the apparatus, the ground-glass finder is first arranged upon the supporting frame and the frame is then manually adjusted to approximately the proper position. Subsequent to such adjustment, it may be shifted step by step in one direction or the other through the medium of the clutch device, heretofore described, so as to secure its accurate adjustment. After the image has been properly focused upon the ground-glass 44, the focusing frame is removed from the supporting frame without however disturbing the adjustment of the supporting frame and the plate-holder is disposed upon the ledge 40 and the shutter thereof is shifted so as to uncover the plate. The exposure may then be made in the usual manner, after which the shutter may be closed and the plate holder removed to permit of further focusing on the ground-glass. It will thus be seen that a number of exposures may be made upon a single plate or film and after development of the plate may be printed one at a time, or all at the same time.

It will further be apparent that the simple arrangement of elements shown and described, whether serving as an attachment to the ordinary portrait camera or as an integral and component part thereof, permits of the exposure of a plate of much greater length than could otherwise be accommodated by the camera.

The apparatus will be found to be highly useful in the studio when taking a number of separate and distinct portraits, inasmuch as all are located upon a single plate and may consequently all be developed at the same time, and that the apparatus is exceptionally well adapted for use in connection with the blending devices fully described and shown in my before mentioned co-pending application, inasmuch as entire family groups may be taken upon a single plate, portraying each member of the group in a number of different poses, and at any desired points upon the sensitized plate.

Having thus described the invention what is claimed as new is:—

1. In a camera back, a back-plate having an opening, a supporting frame mounted for transverse adjustment upon the back-plate, light excluding slides adjustably mounted within the said supporting frame, and a plate holder removably supported by the said frame, and having a sight opening of a width greater than the width of the opening in the back-plate.

2. In a camera back, a back-plate having an opening, a supporting frame mounted for transverse adjustment upon the back-plate and having a sight opening of a width greater than the opening in the back-plate, a holder for a sensitized medium supported by the said frame and having a sight opening approximately of the same size as the opening in the frame, and a light excluding slide adjustably mounted in the opening in the frame and coöperating with the said back-plate to exclude light from the plate-holder when the plate holder and frame are in position projecting beyond the said back-plate.

3. In a camera back, a support for a holder for the sensitized medium adjustably mounted upon the back, and means for adjusting the support including a rod carried thereby, a clutch device slidably mounted upon the rod, means for moving the said clutch device, and means for clutching the same with the rod.

4. In a camera back, a support for a holder for the sensitized medium, adjustably mounted upon the back, and means for adjusting the support including a rod carried by the support, a clutch member slidably mounted upon the rod, a clutch dog carried by the same member and arranged to coöperate with the member in gripping the rod, means for moving the clutch dog into engagement with the rod, and means for moving the said clutch member.

5. In a camera back, a support for a holder for the sensitized medium adjustably mounted upon the back, means for adjusting the support including a rod carried by the support, a clutch member slidably mounted upon the rod, a clutch dog carried by the said member and arranged to coöperate with the said member in gripping the rod, means normally holding the dog out of engagement with the rod, means for moving the dog into such engagement, and means for moving the clutch member.

6. In a camera back, a support for a holder for the sensitized medium adjustably mounted upon the back, means for adjusting the support including a rod carried by the support, a clutch member slidably mounted upon the rod, a clutch-dog carried by the member and arranged to coöperate therewith in gripping the rod, means normally holding the dog out of engagement with the rod, a lever for moving the clutch member, and a lever carried by the first mentioned lever and having connection with the said clutch dog and operable to move the same into clutching engagement with the rod.

7. In a camera back, a support for a holder for the sensitized medium adjustably mounted upon the back, means for adjusting the support including a rod carried by the support, a clutch member slidably mounted upon the rod, a clutch dog carried by the member and arranged to coöperate therewith in gripping the rod, means normally holding the dog out of engagement with the rod, a lever for moving the clutch member, a lever carried by the first mentioned lever and having connection with the said clutch dog and operable to move the same into clutching engagement with the rod, and means whereby the throw of the first mentioned lever may be varied whereby to vary the limits of movement of the said clutch member.

In testimony whereof I affix my signature in presence of two witnesses.

SELEST E. MOINE. [L. S.]

Witnesses:
D. H. CULTON,
P. C. TAYLOR.